United States Patent
Nagata et al.

(10) Patent No.: US 8,042,637 B2
(45) Date of Patent: Oct. 25, 2011

(54) VEHICLE-MOUNTED BATTERY COOLING STRUCTURE

(75) Inventors: Shuichi Nagata, Toyota (JP); Takashi Yamanaka, Kariya (JP)

(73) Assignees: Toyota Jidosha Kabushiki Kaisha, Aichi-Ken (JP); Denso Corporation, Aichi-Ken (JP)

( * ) Notice: Subject to any disclaimer, the term of this patent is extended or adjusted under 35 U.S.C. 154(b) by 123 days.

(21) Appl. No.: 12/447,587

(22) PCT Filed: Dec. 12, 2007

(86) PCT No.: PCT/JP2007/074371
§ 371 (c)(1),
(2), (4) Date: Apr. 28, 2009

(87) PCT Pub. No.: WO2008/072782
PCT Pub. Date: Jun. 19, 2008

(65) Prior Publication Data
US 2010/0089675 A1    Apr. 15, 2010

(30) Foreign Application Priority Data
Dec. 15, 2006    (JP) ................... 2006-338414

(51) Int. Cl.
*B60R 16/04*    (2006.01)
(52) U.S. Cl. .................................................. 180/68.5
(58) Field of Classification Search ................. 180/65.1, 180/68.1, 68.2, 68.5, 89.11
See application file for complete search history.

(56) References Cited

U.S. PATENT DOCUMENTS

| | | | | |
|---|---|---|---|---|
| 4,267,895 | A | * | 5/1981 | Eggert, Jr. ................... 180/68.1 |
| 4,468,440 | A | * | 8/1984 | Evjen ................................ 429/8 |
| 5,390,754 | A | * | 2/1995 | Masuyama et al. .......... 180/68.5 |
| 5,392,873 | A | * | 2/1995 | Masuyama et al. .......... 180/68.5 |
| 5,490,572 | A | * | 2/1996 | Tajiri et al. ................... 180/65.1 |
| 5,518,271 | A | * | 5/1996 | Bell ............................... 280/806 |
| 5,534,364 | A | * | 7/1996 | Watanabe et al. ............... 429/61 |
| 5,641,031 | A | * | 6/1997 | Riemer et al. ................. 429/423 |
| 5,643,691 | A | * | 7/1997 | Iwatsuki et al. ................ 429/54 |
| 5,730,237 | A | * | 3/1998 | Matsuki et al. ............. 180/65.1 |
| 5,753,384 | A | * | 5/1998 | Kimberg ...................... 429/406 |
| 6,094,927 | A | * | 8/2000 | Anazawa et al. ............... 62/239 |
| 6,188,574 | B1 | * | 2/2001 | Anazawa ...................... 361/695 |
| 6,211,646 | B1 | * | 4/2001 | Kouzu et al. ................. 320/107 |
| 6,315,069 | B1 | * | 11/2001 | Suba et al. .................. 180/68.5 |
| 6,335,116 | B1 | * | 1/2002 | Yamane et al. .............. 429/176 |
| 6,541,151 | B2 | * | 4/2003 | Minamiura et al. ........... 429/98 |
| 6,662,891 | B2 | * | 12/2003 | Misu et al. .................. 180/68.1 |
| 6,811,197 | B1 | * | 11/2004 | Grabowski et al. ......... 296/37.8 |
| 6,902,020 | B2 | * | 6/2005 | Kronner et al. ............. 180/68.5 |

(Continued)

FOREIGN PATENT DOCUMENTS

JP    11-234801 A    8/1999

(Continued)

*Primary Examiner* — J. Allen Shriver, II
*Assistant Examiner* — Brodie Follman
(74) *Attorney, Agent, or Firm* — Sughrue Mion, PLLC (57) ABSTRACT

A vehicle-mounted battery cooling structure of the present invention includes a battery a cooling fan for cooling the battery, a cooling-medium channel connecting the battery and the cooling fan, and mounting areas located at a front seat side and a rear seat side, respectively, in a vehicle compartment. The battery is disposed in one of the mounting areas, and the cooling fan is disposed in the other one of the mounting areas.

5 Claims, 9 Drawing Sheets

U.S. PATENT DOCUMENTS

| | | | |
|---|---|---|---|
| 6,957,545 B2 * | 10/2005 | Aoki | 62/208 |
| 7,045,236 B1 * | 5/2006 | Andrew et al. | 429/83 |
| 7,048,321 B2 * | 5/2006 | Bandoh et al. | 296/37.8 |
| 7,240,752 B2 * | 7/2007 | Takahashi et al. | 180/68.1 |
| 7,511,455 B2 * | 3/2009 | Yoneda | 320/112 |
| 7,625,039 B2 * | 12/2009 | Mangiapane et al. | 296/208 |
| 7,631,711 B2 * | 12/2009 | Kubo | 180/68.1 |
| 7,678,494 B2 * | 3/2010 | Tsuchiya | 429/120 |
| 7,733,065 B2 * | 6/2010 | Yoon et al. | 320/150 |
| 7,810,596 B2 * | 10/2010 | Tsuchiya | 180/68.5 |
| 7,900,727 B2 * | 3/2011 | Shinmura | 180/68.1 |
| 7,905,307 B2 * | 3/2011 | Kubota et al. | 180/68.1 |
| 2001/0026887 A1 * | 10/2001 | Minamiura et al. | 429/120 |
| 2001/0030069 A1 * | 10/2001 | Misu et al. | 180/68.1 |
| 2001/0033961 A1 * | 10/2001 | Gudmundsson et al. | 429/62 |
| 2003/0027037 A1 * | 2/2003 | Moores et al. | 429/82 |
| 2003/0082438 A1 * | 5/2003 | Kwon | 429/120 |
| 2004/0016580 A1 * | 1/2004 | Kronner et al. | 180/68.5 |
| 2004/0232672 A1 * | 11/2004 | Bandoh et al. | 280/735 |
| 2005/0285563 A1 * | 12/2005 | Yoneda | 320/112 |
| 2006/0048984 A1 * | 3/2006 | Pleune et al. | 180/68.4 |
| 2006/0096797 A1 * | 5/2006 | Tsuchiya | 180/68.5 |
| 2006/0237248 A1 * | 10/2006 | Hayashi | 180/68.5 |
| 2007/0040418 A1 * | 2/2007 | Ohkuma et al. | 297/15 |
| 2007/0289789 A1 * | 12/2007 | Tsuchiya | 180/68.2 |
| 2007/0292752 A1 * | 12/2007 | Tsuchiya | 429/120 |
| 2008/0047767 A1 * | 2/2008 | Tsuchiya | 180/68.5 |
| 2008/0164081 A1 * | 7/2008 | Watanabe et al. | 180/65.2 |
| 2008/0179040 A1 * | 7/2008 | Rosenbaum | 165/61 |
| 2008/0196957 A1 * | 8/2008 | Koike et al. | 180/68.5 |
| 2008/0202137 A1 * | 8/2008 | Inoue | 62/186 |
| 2008/0257624 A1 * | 10/2008 | Kubo | 180/68.1 |
| 2009/0176150 A1 * | 7/2009 | Yanaka | 429/120 |
| 2009/0183935 A1 * | 7/2009 | Tsuchiya | 180/68.1 |
| 2009/0249803 A1 * | 10/2009 | Suzuki et al. | 62/56 |
| 2009/0257190 A1 * | 10/2009 | Yoda | 361/690 |
| 2010/0099019 A1 * | 4/2010 | Nagata et al. | 429/120 |

FOREIGN PATENT DOCUMENTS

| | | | |
|---|---|---|---|
| JP | 2004-345447 A | | 12/2004 |
| JP | 2005-306239 A | | 11/2005 |
| JP | 2006-141153 A | | 6/2006 |
| JP | 2006-141157 A | | 6/2006 |
| JP | 2006-151270 A | | 6/2006 |
| JP | 2006-188182 A | | 7/2006 |
| JP | 2006-273191 A | | 10/2006 |
| JP | 2006-286519 A | | 10/2006 |
| JP | 2006273191 A | * | 10/2006 |
| WO | 2006/109391 A1 | | 10/2006 |

* cited by examiner

VEHICLE-MOUNTED BATTERY COOLING STRUCTURE

TECHNICAL FIELD

The present invention relates to a vehicle-mounted battery cooling structure, and more particularly to a vehicle-mounted battery cooling structure including a battery and a cooling fan.

BACKGROUND ART

A battery mounted on a hybrid vehicle or an electric vehicle generates heat during charging and discharging. Accordingly, some conventional vehicle-mounted batteries are provided with a cooling structure. Such a vehicle-mounted battery cooling structure is disclosed, for example, in Japanese Patent Laying-Open No. 2005-306239 (Patent Document 1).

Figure 9:
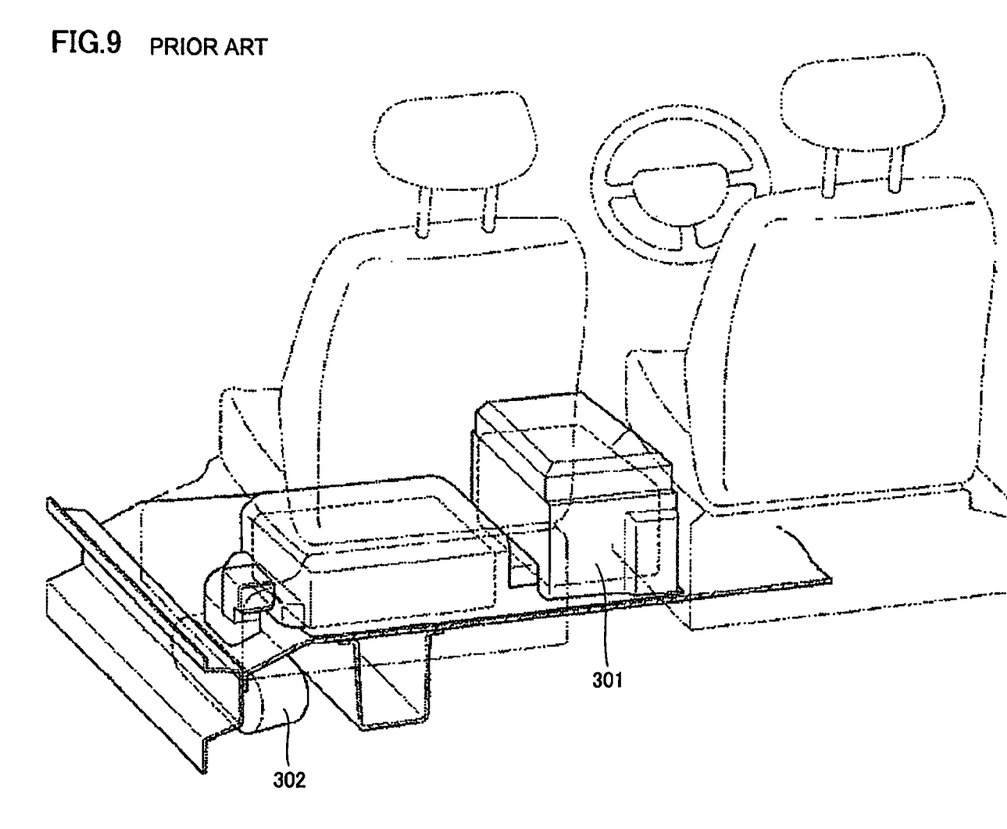
FIG. 9 is a perspective view showing a structure of a battery according to a conventional technique.

Patent Document 1 (see FIG. 9) discloses a cooling structure in which a battery 301 is disposed between a driver seat and a front passenger seat to guide cooling air from battery 301 toward the front passenger seat by means of a fan 302.

DISCLOSURE OF THE INVENTION

With the conventional battery cooling structure mentioned above, battery 301 and fan 302 are arranged in a limited space at a front seat including the driver seat and the front passenger seat. This causes a complicated arrangement of a duct for discharging cooling air and an inevitably sharp bend of the duct.

The larger the number of sharp bends the duct has, the greater the flow resistance of cooling air, resulting in reduced cooling efficiency, noise and the like. The conventional battery cooling structure requires the duct that guides the cooling air to be bent many times in a limited space, which inevitably causes such problems.

The present invention was made to solve the above problems. An object of the invention is to provide a vehicle-mounted battery cooling structure which enables efficient exhaustion of cooling air by avoiding a complicated arrangement of the duct connecting a battery and a fan.

A vehicle-mounted battery cooling structure according to the present invention includes a battery, a cooling fan for cooling the battery, a cooling-medium channel for connecting the battery and the cooling fan, and mounting areas located at a front seat side and a rear seat side, respectively, in a vehicle compartment. The battery is disposed in one of the mounting areas, and the cooling fan is disposed in the other one of the mounting areas.

In the above-described vehicle-mounted battery cooling structure, the battery may be disposed in one of the mounting areas at the front seat side, and the cooling fan may be disposed in the other one of the mounting areas at the rear seat side.

In the above-described vehicle-mounted battery cooling structure, the mounting area at the front seat side may be located between a driver seat and a front passenger seat, and the battery may be disposed in the mounting area. The mounting area at the rear seat side may be located under a rear seat, and the cooling fan may be disposed in the mounting area.

In the above-described vehicle-mounted battery cooling structure, the battery may include an exhaust chamber from which cooling air is discharged upon cooling of the battery. The cooling fan may be disposed, as seen in a plan view, on an extended line of a direction of discharging the cooling air from the exhaust chamber.

In the above-described vehicle-mounted battery cooling structure, the battery and the cooling fan may be secured to a floor panel constituting a part of a vehicle body.

Two or more of the above-described structures may be combined together as appropriate.

A vehicle-mounted battery cooling structure according to the present invention enables efficient exhaustion of cooling air by avoiding a complicated arrangement of a duct connecting a battery and a fan.

BEST MODES FOR CARRYING OUT THE INVENTION

In the following description, a vehicle-mounted battery cooling structure according to each embodiment of the present invention will be described with reference to the drawings. Like or corresponding parts in the respective embodiments will be denoted by like reference numerals and redundant description will not be repeated.

First Embodiment

Figure 1:
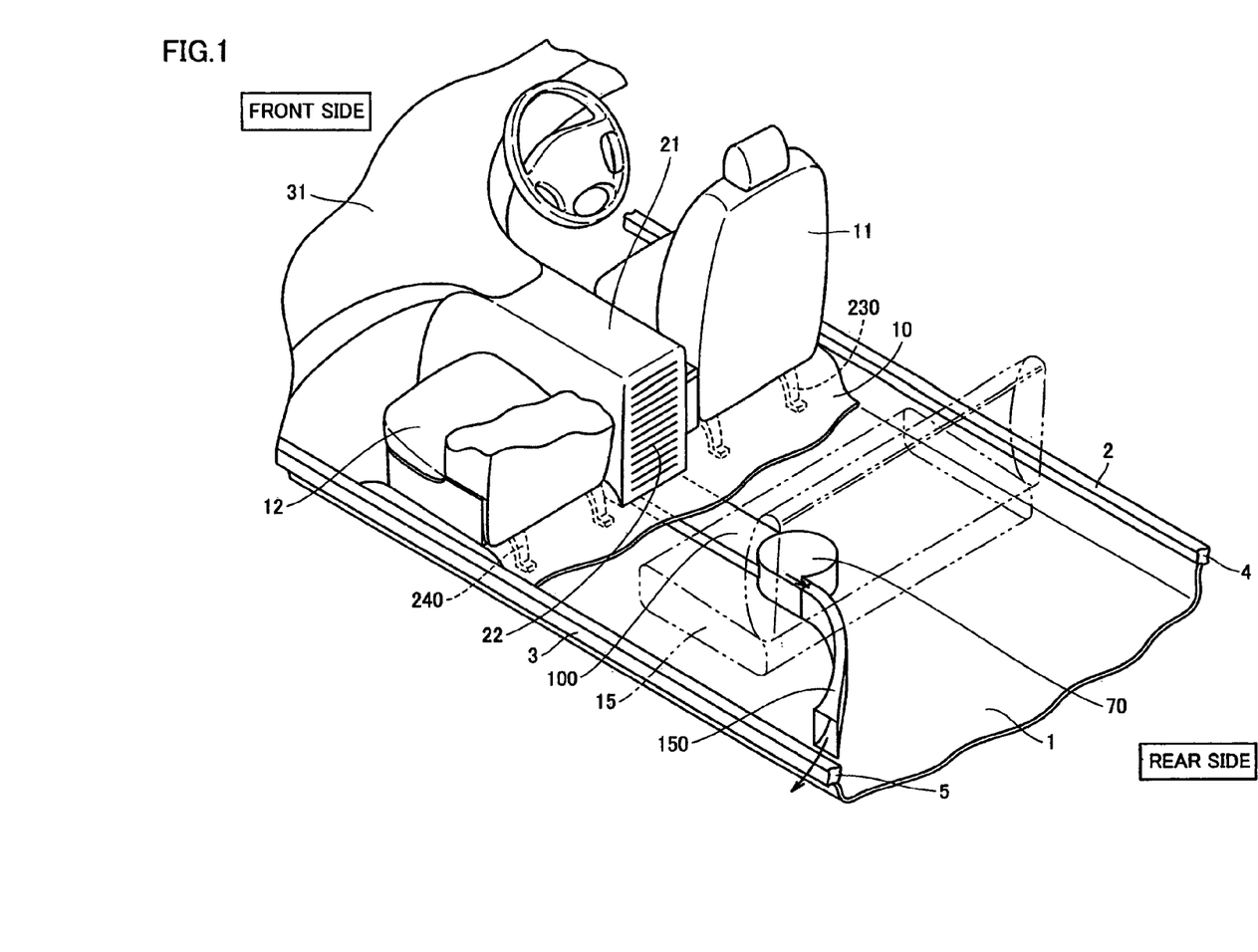
FIG. 1 is a perspective view showing a structure inside a vehicle compartment according to a first embodiment of the present invention.

A first embodiment of the present invention will now be described with reference to FIGS. 1 to 4. FIG. 1 is a perspective view showing a structure inside a vehicle compartment. FIG. 1 shows a hybrid vehicle powered by an internal combustion engine such as a gasoline engine or a diesel engine and by a chargeable and dischargeable power source.

In the vehicle compartment, a driver seat 11 and a front passenger seat 12 as a front seat according to the present embodiment are arranged aside in the widthwise direction of the vehicle, as shown in FIG. 1. Driver seat 11 and front passenger seat 12 are secured to a floor panel 1 by means of seat legs 230 and seat legs 240, respectively. A floor carpet 10 is provided on the surface of floor panel 1. Floor carpet 10 is arranged so as to cover seat legs 230 and 240. In the present embodiment, floor carpet 10 has its surface sloped downward in a leg area between the front seat and a rear seat 15.

Provided between floor panel 1 and floor carpet 10 in the vehicle compartment are an area under the front seat at least including driver seat 11 and front passenger seat 12 as well as an area between and below driver seat 11 and front passenger seat 12. An area is also provided under rear seat 15 between floor panel 1 and floor carpet 10. These areas constitute mounting areas in which a battery pack and a cooling fan are mounted.

It should be noted that the mounting areas in which a battery pack and a cooling fan are mounted are not limited to the areas under the front seat and rear seat. An area between driver seat 11 and front passenger seat 12 at the front seat also constitutes a mounting area. When the rear seat is separated into right and left seats with an area therebetween, the area also constitutes a mounting area. The arrangement of battery packs and cooling fan in these mounting areas will be described later.

Scuff plates 2 and 3 are arranged at a side of driver seat 11 and at a side of front passenger seat 12, respectively. Scuff plates 2 and 3 are disposed along the circumference inside the vehicle compartment. Scuff plates 2 and 3 extend in the front-to-rear direction of the vehicle. Scuff plates 2 and 3 cover a welded section formed on floor panel 1. Interconnect lines not shown are routed respectively in a cavity 4 surrounded by scuff plate 2 and floor panel 1 as well as in a cavity 5 surrounded by scuff plate 3 and floor panel 1.

Provided between driver seat 11 and front passenger seat 12 is a center console box 21 made of resin extending in the front-to-rear direction of the vehicle. Center console box 21 has substantially a rectangular parallelepiped shape. In the present embodiment, center console box 21 is connected to a dashboard 31 extending rearward behind the windshield. Center console box 21 and dashboard 31 may be separated from each other.

Center console box 21 is disposed in the vicinity of the center of the vehicle in the widthwise direction of the vehicle. Center console box 21 is provided for the purpose of improving the interior aesthetics in the vehicle compartment or to provide a cup holder for the placement of a beverage container or a recess in which small articles can be placed.

Formed on the back face of center console box 21 are air inlet slits 22 through which air in the vehicle compartment is drawn into center console box 21. Air inlet slits 22 are arranged to face rear seat 15 (or a second-row seat in a vehicle having three rows of seats). Air inlet slits 22 may be provided only in the vicinity of the floor or may be provided at an upper part on the back face of center console box 21.

Figure 2:
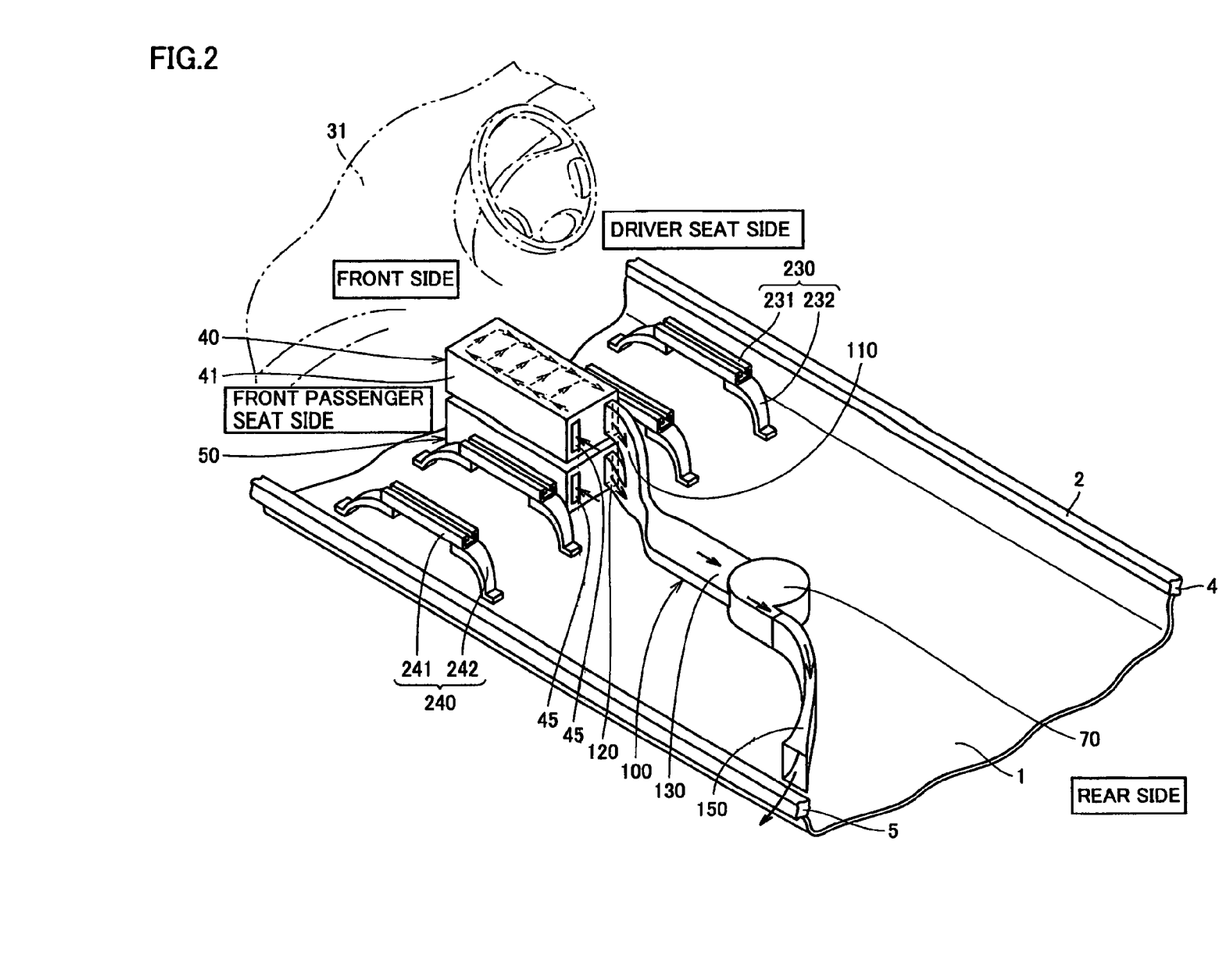
FIG. 2 is a perspective view showing a vehicle-mounted battery cooling structure mounted on a vehicle according to the first embodiment of the present invention.

FIG. 2 is a perspective view showing a vehicle-mounted battery cooling structure according to the present embodiment, mounted on the hybrid vehicle shown in FIG. 1. As shown in FIGS. 1 and 2, a pair of seat legs 230 is arranged at a predetermined distance therebetween in the widthwise direction of the vehicle. Seat legs 230 each include a guide rail 231 and leg portions 232 having a semi-arcuate shape. Driver seat 11 is mounted on guide rails 231. Seat legs 230 extend in the front-to-rear direction of the vehicle and have an upwardly protruding arcuate shape.

Seat legs 240 have a structure similar to that of seat legs 230. Seat legs 240 each include a guide rail 241 and leg portions 242. Front passenger seat 12 is mounted on guide rails 241.

Center console box 21 stores a first battery pack 40, a second battery pack 50 and a junction box not shown electrically connected to these battery packs. First battery pack 40 and second battery pack 50 are stacked vertically. First battery pack 40 is disposed above second battery pack 50.

The junction box is equipped with peripheral devices such as a battery computer, a relay for controlling a high-voltage circuit for batteries, various types of sensors that sense the total voltage and charging/discharging currents of the batteries, and a service plug for shutting off the high-voltage circuit during inspection and maintenance of the battery packs.

Figure 3:
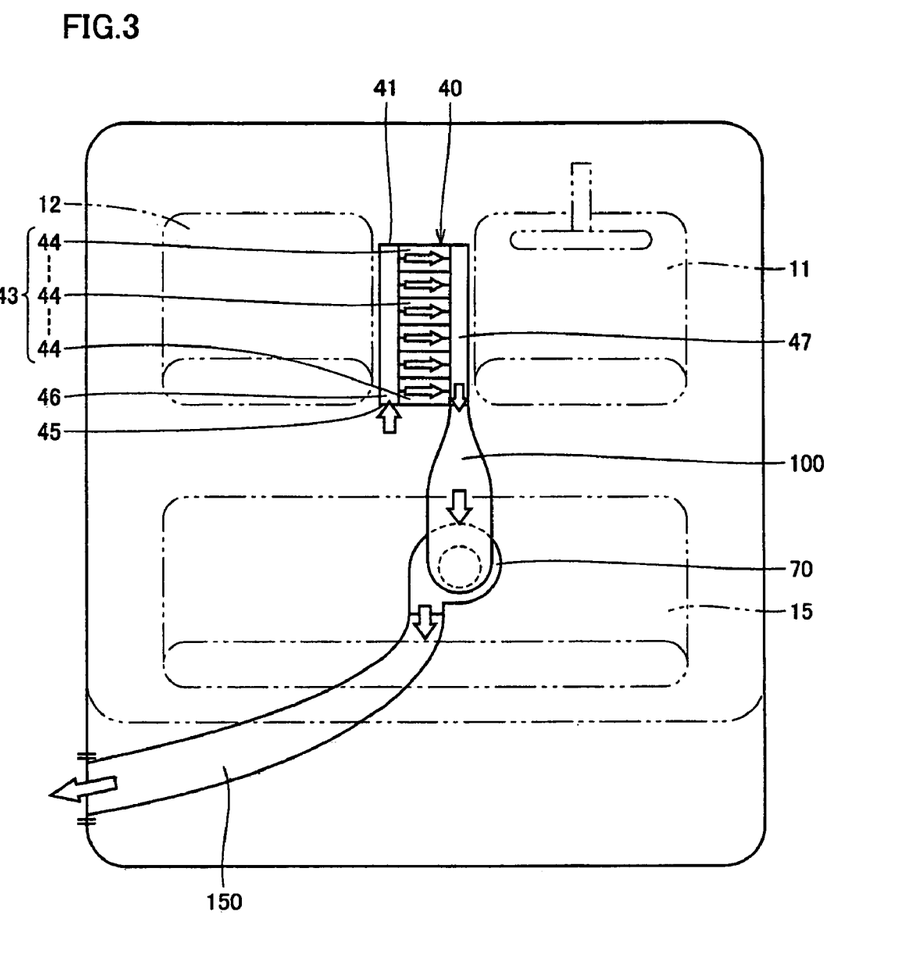
FIG. 3 is a plan view schematically showing the vehicle-mounted battery cooling structure according to the first embodiment of the present invention.

FIG. 3 is a plan view schematically showing the vehicle-mounted battery cooling structure according to the present embodiment. Herein, first battery pack 40 positioned on the upper stage will now be described with reference to FIG. 3. Second battery pack 50 positioned on the lower stage has exactly the same structure as first battery pack 40.

As shown in FIG. 3, first battery pack 40 includes a battery 43 as a secondary battery and a battery case 41 that stores battery 43.

Battery 43 includes a plurality of battery modules 44 aligned adjacent to one another in the front-to-rear direction of the vehicle. Battery modules 44 have a plate shape. Each battery module 44 has a battery cell therein. Each battery module 44 includes a plurality of battery cells in one case, or includes a single battery cell in the other case.

Flow passages for flowing cooling air are provided between battery modules 44 arranged adjacent to one another. More specifically, a holding plate with a plurality of grooves formed on its surface is provided between adjacent ones of battery modules 44. The grooves on the holding plate form the flow passages through which the cooling air flows. Plurality of battery modules 44 are connected electrically in series to each other.

Battery 44 is not particularly limited as long as it is a chargeable and dischargeable secondary battery. For example, it may be a nickel metal hydride battery or a lithium ion battery.

Battery case 41 is made of metal. To ensure the strength, battery case 41 is made of a galvanized steel plate, for example. Battery case 41 is arranged so as to surround the circumference of battery 43. Battery case 41 is formed in substantially a rectangular parallelepiped shape having a long side direction and a short side direction as the vehicle is seen in a plan view. The long side direction of battery case 41 corresponds to the front-to-rear direction of the vehicle, and the short side direction of battery case 41 corresponds to the widthwise direction of the vehicle.

Battery case 41 houses an intake chamber 46 and an exhaust chamber 47. Intake chamber 46 is disposed on one side face of battery 43. Exhaust chamber 47 is disposed on the other side face of battery 43. In the present embodiment, intake chamber 46 is arranged closer to the front passenger seat, and exhaust chamber 47 is arranged closer to the driver seat.

Battery case 41 has an air intake port 45 through which air in the vehicle compartment is taken in into intake chamber 46 as cooling air. The cooling air taken in into intake chamber 46 through air intake port 45 flows through intake chamber 46 toward the front of the vehicle.

The cooling air out of intake chamber 46 flows in the lateral direction through the flow passages provided between adjacent battery modules 44 to reach exhaust chamber 47. At this stage, the cooling air absorbs heat generated by battery 43 to cool down battery 43. The cooling air raised in temperature by the contact with battery 43 flows through exhaust chamber 47 toward the rear side of the vehicle to flow into an exhaust duct 100.

Battery pack 40 according to the present embodiment having a lateral flow configuration in which cooling air flows laterally may be replaced by a vertical flow configuration in which cooling air flows vertically. The battery packs according to the present embodiment are implemented by two battery packs 40 and 50 stacked in two stages, by way of example. Alternatively, a single-stage battery pack or battery packs stacked in three or more stages may be employed according to a required battery capacity.

First battery pack 40 is secured to second battery pack 50 by means of a fastener or the like. Second battery pack 50 is secured directly to floor panel 1 by means of a fastener or the like.

A shield cover not shown is provided within center console box 21. The shield cover is made of metal. The shield cover is arranged so as to surround the circumferences of first battery pack 40, second battery pack 50 and junction box. The shield cover prevents electromagnetic waves generated at first battery pack 40, second battery pack 50 and junction box from leaking into the vehicle compartment.

As shown in FIG. 2, an exhaust duct branch 110 that is a branched portion at the upstream side of exhaust duct 100 is connected to exhaust chamber 47 of first battery pack 40. An exhaust duct branch 120 that is a branched portion at the upstream side of exhaust duct 100 is also connected to an exhaust chamber of second battery pack 50.

Exhaust duct branches 110 and 120 join together into an exhaust duct body 130 to be guided to a cooling fan 70. Herein, exhaust duct body 130 has a low profile with its width being sufficiently greater than its height. This can prevent the duct from projecting into the leg area between the front seat and rear seat. However, this shape may be determined according to necessity, and is not limited to this configuration.

Cooling fan 70 is implemented by a sirocco fan. The sirocco fan is an electrically-driven fan that draws in air from the center of the rotating fan along the rotary shaft and discharges the air in the radial direction of the rotary shaft. Cooling fan 70 is located downstream of the flow of cooling air with respect to battery 43. As shown in FIGS. 1 and 3, cooling fan 70 is disposed in an area directly under rear seat 15 and secured directly to floor panel 1. Cooling fan 70 communicates with a discharge duct 150. The fan is not limited to the sirocco fan, and may alternatively be a crossflow type fan or a propeller fan, for example.

Discharge duct 150 extends along the body passing under rear seat 15 and under the floor of a luggage compartment, and has its downstream end communicating with an interior-air discharge vent of the vehicle body called a quarter vent. This interior-air discharge vent is provided, for example, at the back of a bumper or within a quarter pillar, for discharging air inside the vehicle compartment. The structure of discharge duct 150 may be changed variously according to the shape of a structure forming the vehicle body, the layout inside the vehicle compartment, and the like. Considering the discharge efficiency of cooling air, discharge duct 150 is preferably guided to the interior-air discharge vent with the fewest possible bends.

As shown in FIG. 3, in the vehicle-mounted battery cooling structure according to the present embodiment, battery pack 40 is disposed in the mounting area between driver seat 11 and front passenger seat 12, and cooling fan 70 is disposed in the mounting area under rear seat 15. This can ensure a sufficient space between battery pack 40 and cooling fan 70 corresponding to at least the space between the front seat and rear seat 15.

Accordingly, exhaust duct 100 functioning as a cooling-medium channel that guides cooling air from battery pack 40 can be arranged without complicatedness. As a result, the flow resistance of cooling air flowing through exhaust duct 100 can be reduced to minimum, which enables highly efficient exhaustion. In addition, noise produced by the cooling air flowing through exhaust duct 100 can also be minimized.

Operation of cooling fan 70 produces noise due to the rotation of a motor and a fan. Since cooling fan 70 is disposed under rear seat 15 away from the driver seat in the present embodiment, the noise of cooling fan 70 is less likely to reach the driver. The mounting area under rear seat 15 does not need to be large because cooling fan 70 commonly has a lower height than battery packs 40 and 50. Various seat arrangements are desired for rear seat 15 by folding it partially or entirely, for example. Minimizing the mounting area under rear seat 15 can ensure a sufficient space for folding rear seat 15. This in result can achieve a structure that enables more ideal seat arrangements.

Further, in the present embodiment, cooling fan 70 is arranged, as seen in a plan view, on the extended line of the direction of discharging cooling air from exhaust chamber 47 of battery pack 40. Accordingly, battery pack 40, cooling fan 70 and exhaust duct 100 connecting them can be arranged on a straight line as seen in a plan view, which can achieve more improved exhaust efficiency and prevent noise.

In the present embodiment, battery packs 40 and 50 are disposed in the mounting area at the front seat side, and cooling fan 70 is disposed in the mounting area at the rear seat side. If such an arrangement is impractical according to some constraints, cooling fan 70 may be disposed in the mounting space closer to the front seat, and battery packs 40 and 50 are disposed in the mounting space closer to the rear seat. In this case, exhaust duct 100 functioning as a cooling-medium channel that guides cooling air from battery packs 40 and 50 can also be arranged without complicatedness, which achieves the effect of minimizing the flow resistance of cooling air flowing through exhaust duct 100. When disposing battery packs 40 and 50 in the mounting area closer to the front seat, they may be disposed directly under the driver seat or front passenger seat.

Figure 4:
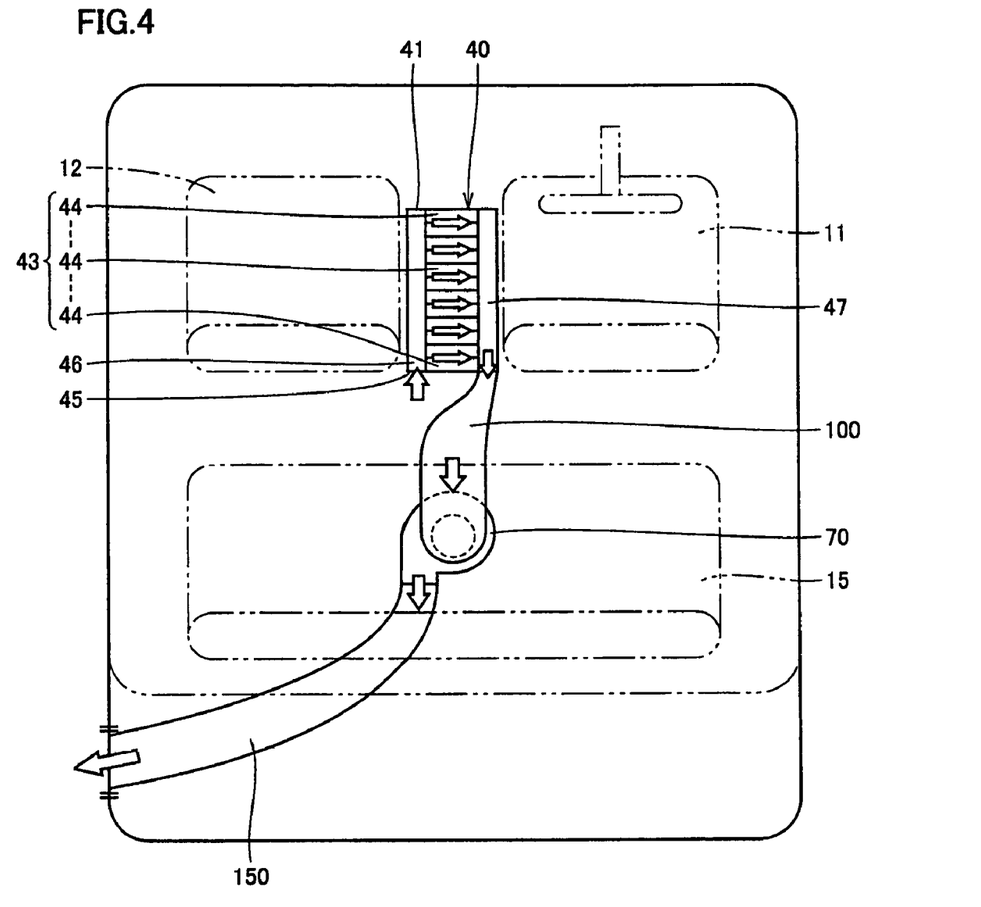
FIG. 4 is a plan view schematically showing a vehicle-mounted battery cooling structure according to a modification of the first embodiment of the present invention.

FIG. 4 is a plan view schematically showing a vehicle-mounted battery cooling structure according to a modification of the present embodiment. In the vehicle-mounted battery cooling structure shown in FIG. 3, cooling fan 70 is arranged on the extended line of the direction of discharging cooling air from exhaust chamber 47 of battery pack 40. In the modification shown in FIG. 4, cooling fan 70 is arranged slightly closer to the center in the widthwise direction of the vehicle with respect to the extended line of the direction of discharging cooling air from exhaust chamber 47.

Although the arrangement shown in FIG. 3 is more preferred, the arrangement of the present modification ensures a sufficient distance between battery pack 40 and cooling fan 70, thus raising only a minor influence. In this case, it is more preferable to ensure a sufficient width for exhaust duct 100.

Second Embodiment

Figure 5:
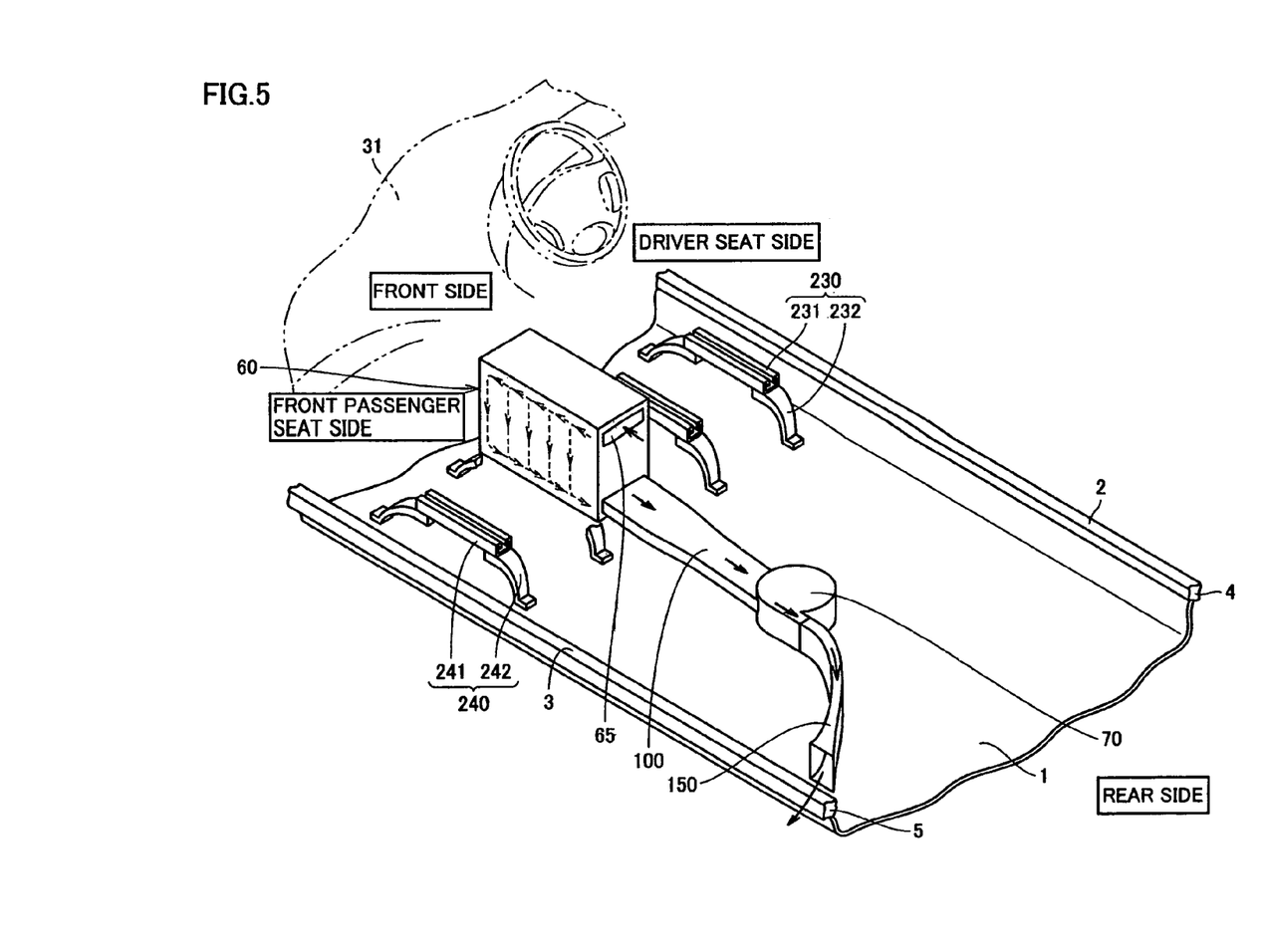
FIG. 5 is a perspective view showing a vehicle-mounted battery cooling structure according to a second embodiment of the present invention.

FIG. 5 is a perspective view showing a vehicle-mounted battery cooling structure according to the present embodiment. In the present embodiment, a single-stage battery pack 60 is provided. Further, flow passages of cooling air within battery pack 60 have the vertical flow configuration.

Within battery pack 60 shown in FIG. 5, battery modules 44 are aligned adjacent to one another in the front-to-rear direction of the vehicle, similarly to the first embodiment. The flow passages for flowing cooling air are provided between adjacent battery modules 44. In the present embodiment, the flow passages communicate vertically.

An intake chamber is provided at the upper part within battery pack 60. An exhaust chamber is provided at the lower part within battery pack 60. The flow path has its upper end communicating with the intake chamber and its lower end communicating with the exhaust chamber.

An air intake port 65 is provided at the upper part on the back face of battery pack 60. Exhaust duct 100 is connected to the lower end on the back face of battery pack 60. Exhaust duct 100 communicates with the exhaust chamber within battery pack 60. In the present embodiment, bifurcation of exhaust duct 100 is not required, and the exhaust chamber is disposed at the lower end of battery pack 60. Accordingly, exhaust duct 100 is arranged along the floor surface formed by floor panel 1.

Cooling fan 70 is disposed, as seen in a plan view, on the extended line of the direction of discharging cooling air from the exhaust chamber of battery pack 60. As seen from the side, cooling fan 70 is also positioned on the extended line of the direction of discharging cooling air from the exhaust chamber of battery pack 60. Accordingly, in the present embodiment, exhaust duct 100 can be configured completely linearly. This in result can achieve more improved exhaust efficiency and prevent noise.

Third Embodiment

Figure 6:
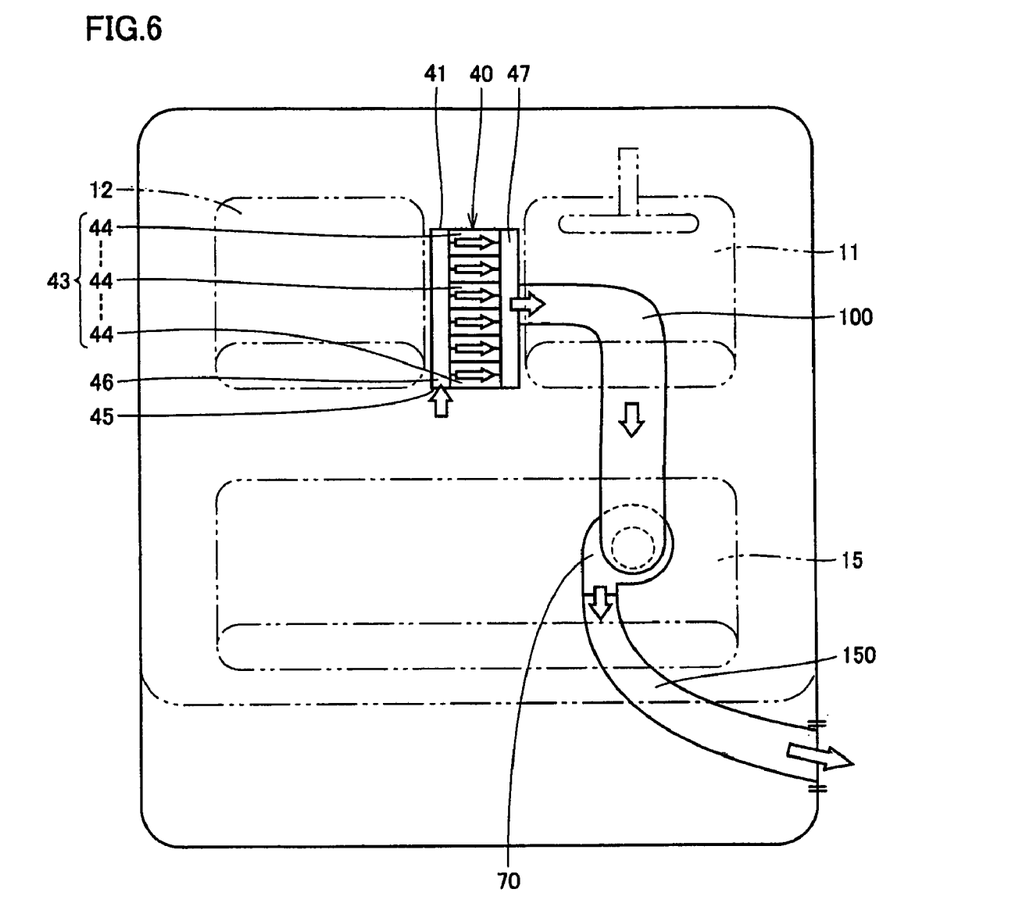
FIG. 6 is a plan view showing a vehicle-mounted battery cooling structure according to a third embodiment of the present invention.

FIG. 6 is a plan view showing a vehicle-mounted battery cooling structure according to the present embodiment. The vehicle-mounted battery cooling structure according to the present embodiment differs from that of the first embodiment by the configuration of exhaust chamber 47 provided in battery pack 40, the configuration of exhaust duct 100 communicating with exhaust chamber 47, and the arrangement of cooling fan 70 and discharge duct 150.

In the present embodiment, exhaust duct 100 is connected to a side face of exhaust chamber 47, as shown in FIG. 6. Cooling air flowing through intake chamber 46 toward the front of the vehicle flows laterally through flow passages between adjacent battery modules 44. Upon reaching exhaust chamber 47, the cooling air flows through exhaust chamber 47 to a position where exhaust duct 100 is connected.

Exhaust duct 100 extends laterally from exhaust chamber 47, and is bent rearwards to extend linearly in the rear direction. Cooling fan 70 is placed on the extended line of exhaust duct 100.

The configuration according to the present embodiment may be employed when it is difficult to connect exhaust duct 100 to the rear side of exhaust chamber 47 as in the first embodiment. The configuration of the present embodiment with exhaust duct 100 bent rearwards is less advantageous than that of the first embodiment in the exhaust efficiency and the like. In the present embodiment, however, battery pack 40 is disposed between driver seat 11 and front passenger seat 12 to allow exhaust duct 100 to be bent in the space under driver seat 11 or front passenger seat 12. This eliminates the need to bend exhaust duct 100 sharply. Accordingly, employing the arrangement of the present embodiment will not significantly degrade the exhaust efficiency.

Figure 7:
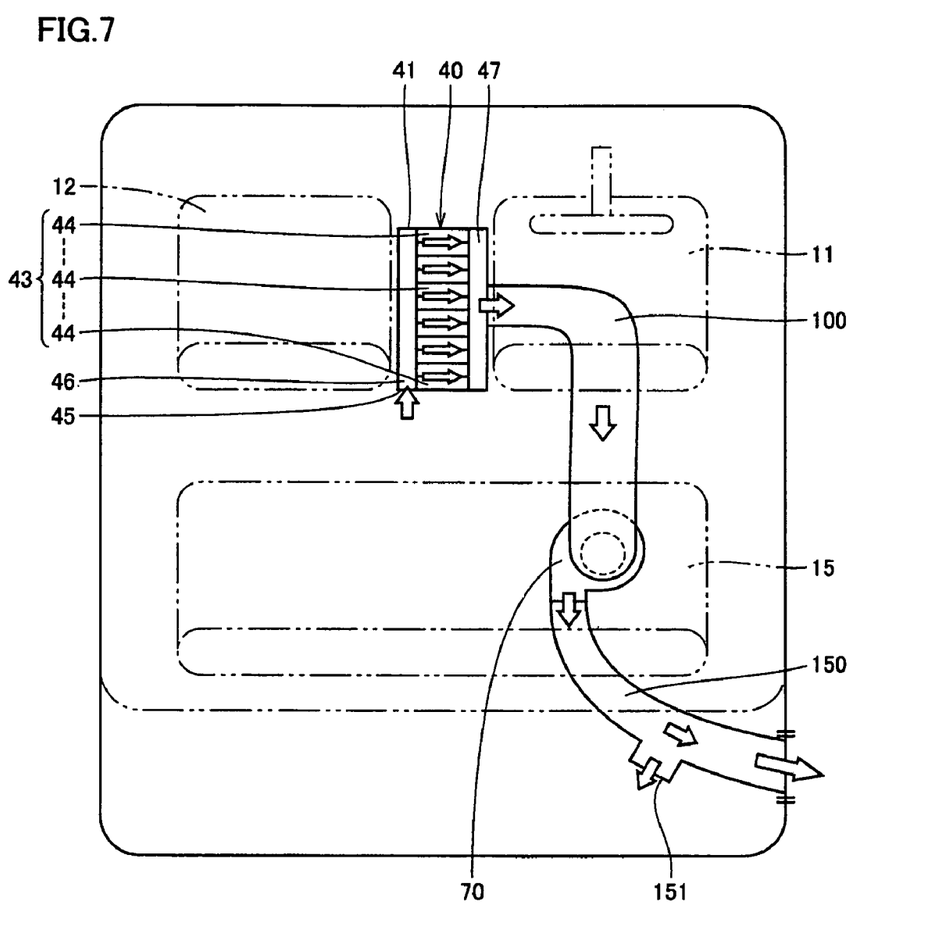
FIG. 7 is a plan view showing a vehicle-mounted battery cooling structure according to a modification of the third embodiment of the present invention.

FIG. 7 is a plan view showing a vehicle-mounted battery cooling structure according to a modification of the present embodiment. In the present modification, an opening 151 communicating with the luggage compartment is provided at a portion of discharge duct 150. The provision of opening 151 allows a portion of cooling air discharged through discharge duct 150 to be released into the vehicle compartment.

Releasing all the cooling air out of the vehicle will cause a negative pressure inside the vehicle compartment, which may cause air polluted with the exhaust gas external to the vehicle to flow into the vehicle compartment through clearances or the like. Releasing a portion of cooling air out of the vehicle as in the present modification can avoid an extremely negative pressure inside the vehicle compartment. This in turn can prevent the air external to the vehicle from flowing into the vehicle compartment.

Opening 151 may be configured to allow opening and closure so as to be opened and closed according to the operation speed of cooling fan 70. More specifically, opening 151 may be closed when cooling fan 70 is operated at a low speed, and may be opened only when cooling fan 70 is operated at a high speed.

The all the cooling air may be released into the vehicle compartment. Releasing the cooling air into or in the vicinity of the luggage compartment in the vehicle so as not to make a direct contact with a passenger aboard the vehicle can prevent the passenger from directly sensing the heat, thereby avoiding discomfort.

Fourth Embodiment

Figure 8:
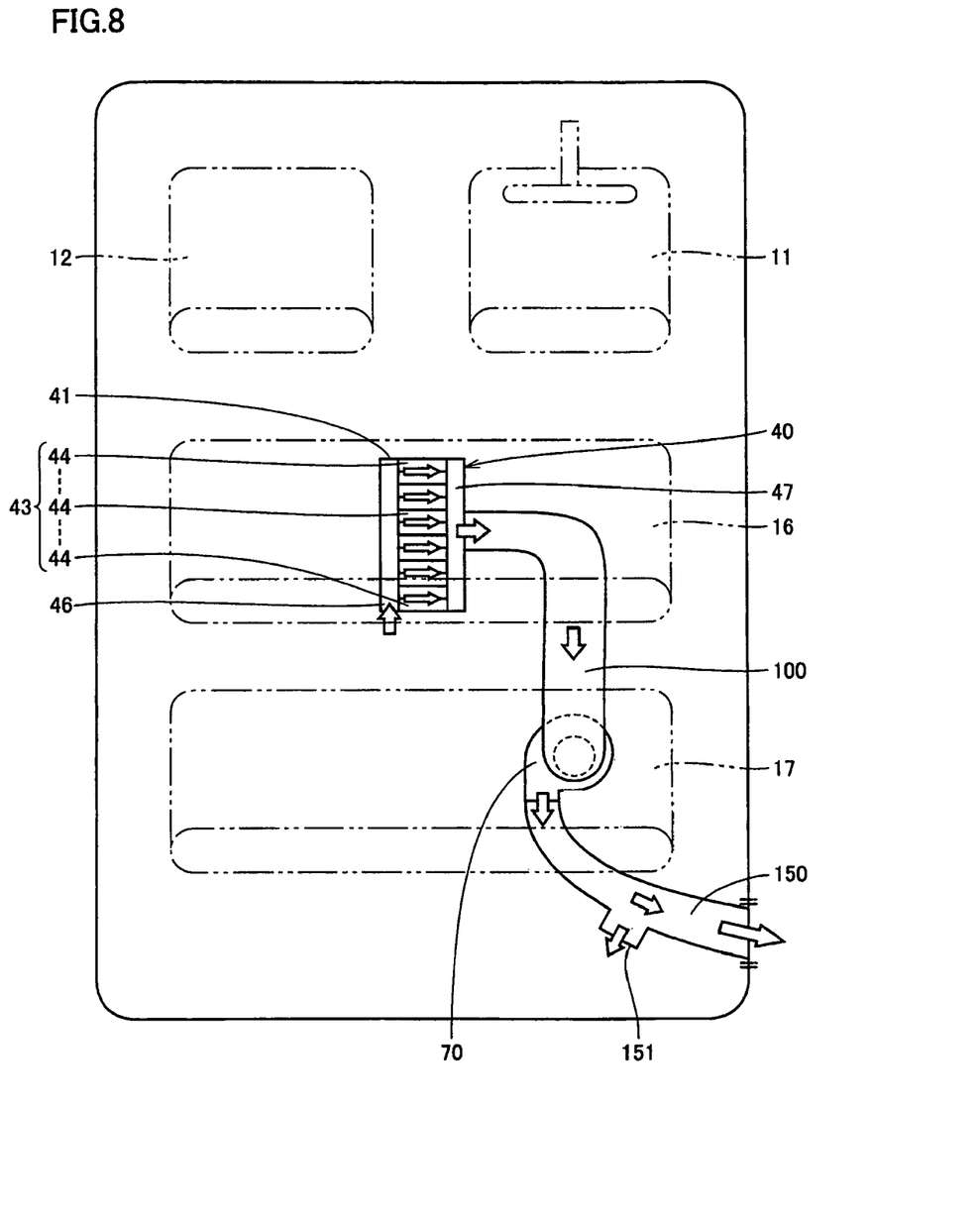
FIG. 8 is a plan view showing a vehicle-mounted battery cooling structure according to a fourth embodiment of the present invention.

FIG. 8 is a plan view showing a vehicle-mounted battery cooling structure according to the present embodiment. In the present embodiment, the vehicle has three rows of seats. Battery pack 40 is disposed under a second-row seat 16 which corresponds to a front seat with respect to a third-row seat 17, and cooling fan 70 is disposed under third-row seat 17 which corresponds to a rear seat with respect to second-row seat 16.

Exhaust chamber 47, exhaust duct 100 and discharge duct 150 are configured similarly to those of the third embodiment. Disposing battery pack 40 in a mounting area under second-row seat 16 and disposing cooling fan 70 in a mounting area under third-row seat 17 also allows a sufficient space at least corresponding to the space between second-row seat 16 and third-row seat 17 to be ensured between battery pack 40 and cooling fan 70.

Accordingly, exhaust duct 100 functioning as a cooling-medium channel that guides cooling air from battery pack 40 can be arranged without complicatedness. As a result, the flow resistance of cooling air flowing through exhaust duct 100 can be reduced to minimum, which enables highly efficient exhaustion. In addition, noise produced by the cooling air flowing through exhaust duct 100 can also be minimized.

Second-row seat 16 may be separated into right and left seats with a space therebetween for arranging battery pack 40 in that space.

Battery pack 40 may be arranged between driver seat 11 and front passenger seat 12 as first-row seats, and cooling fan 70 may be arranged under third-row seat 17.

It should be construed that the embodiments disclosed herein are by way of illustration in all respects and not intended to be limiting. It is intended that the scope of the present invention is defined by claims, not by the description above, and includes all modifications and variations equivalent in meaning and scope to the claims.

INDUSTRIAL APPLICABILITY

A vehicle-mounted battery cooling structure according to the present invention enables efficient exhaustion of cooling air by avoiding a complicated arrangement of a duct connecting a battery and a fan.

The invention claimed is:

1. A vehicle-mounted battery cooling structure comprising:
   a battery;
   a cooling fan for cooling said battery;
   a cooling-medium channel for connecting said battery and said cooling fan, wherein the battery, cooling fan and cooling-medium channel are arranged in a substantially straight line; and mounting areas located at a front seat side and a rear seat side, respectively, in a vehicle compartment, wherein said battery is disposed in one of said mounting areas, and said cooling fan is disposed in the other one of said mounting areas.

2. The vehicle-mounted battery cooling structure according to claim 1, wherein said battery is disposed in one of said mounting areas at the front seat side, and said cooling fan is disposed in the other one of said mounting areas at the rear seat side.

3. The vehicle-mounted battery cooling structure according to claim 2, wherein the mounting area at said front seat side is located between a driver seat and a front passenger seat, and said battery is disposed in the mounting area, and the mounting area at said rear seat side is located under a rear seat, and said cooling fan is disposed in the mounting area.

4. The vehicle-mounted battery cooling structure according to claim 1, wherein said battery includes an exhaust chamber from which cooling air is discharged upon cooling of the battery, and said cooling fan is disposed, as seen in a plan view, on an extended line of a direction of discharging cooling air from said exhaust chamber.

5. The vehicle-mounted battery cooling structure according to claim 1, wherein said battery and said cooling fan are secured to a floor panel constituting a part of a vehicle body.

* * * * *